F. CONRAD.
ELECTRICAL SYSTEM.
APPLICATION FILED SEPT. 3, 1907.
934,596.
Patented Sept. 21, 1909.
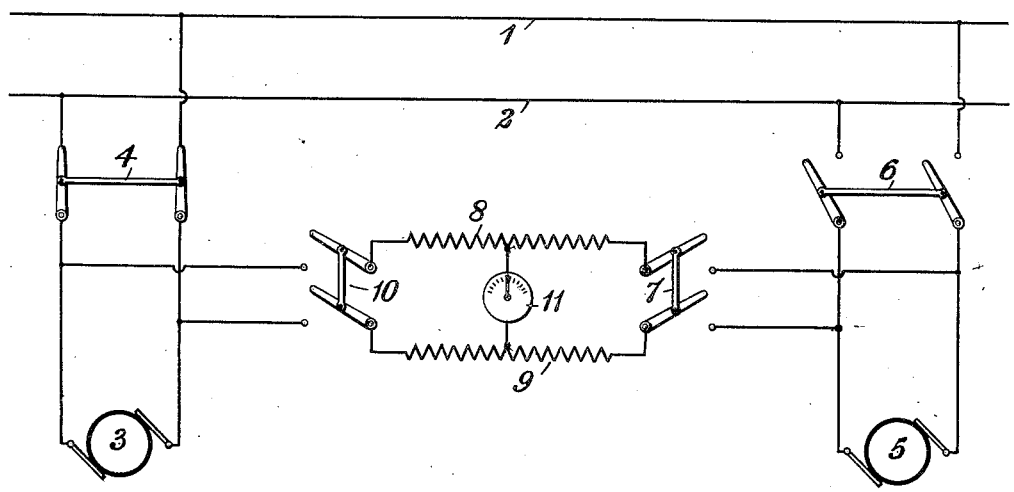
WITNESSES:
C. L. Belcher
Otto S. Schairer.
INVENTOR
Frank Conrad
BY
Wiley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

934,596.

Specification of Letters Patent. Patented Sept. 21, 1909.

Application filed September 3, 1907. Serial No. 391,212.

*To all whom it may concern:*

Be it known that I, FRANK CONRAD, a citizen of the United States, and a resident of Swissvale, in the county of Allegheny and State of Pennsylvania, have invented a new and useful Improvement in Electrical Systems, of which the following is a specification.

My invention relates to electrical systems, and it has for its object to provide a system in which any difference between the voltages of two circuits may be indicated and measured without permitting an appreciable flow of current between the circuits.

When two electrical circuits are to be connected in parallel it is usually desirable to know the difference, if any, between their voltages in order that the circuits may not be connected in parallel unless and until their voltages are approximately equal.

The difference between the voltages of two circuits has heretofore usually been determined by connecting together terminals or conductors of the said circuits of like polarity, and including in one of said connections a voltmeter or another suitable indicating instrument. When this system is employed, however, considerable amounts of current may flow from one circuit to another, if the voltages of the circuits are widely different and particularly if the generators or other sources that supply the said circuits are of large capacity.

In the system of the present invention there are no low resistance connections between the circuits, and the system is otherwise so arranged that a transfer of current from one circuit to another cannot be effected.

In a single figure of the accompanying drawing, which is a diagrammatic view of a system that embodies my invention, a distributing circuit 1—2 is supplied from a generator 3 or other suitable source of current that is connected to the circuit by means of a double pole switch 4. Another generator or other suitable source 5 may be connected, by means of a double throw switch 6, to the distributing circuit 1—2, and, by means of a switch 7, to terminals of two resistances 8 and 9, the other terminals of which may be connected, respectively, to the generator 3 by means of a switch 10, the switches 7 and 10 being so arranged that, when closed, the resistances 8 and 9 will be connected between terminals or conductors of the sources 3 and 5 having unlike polarity.

A voltmeter or other suitable indicating instrument 11 is connected between the neutral or other suitable intermediate points of the resistances 8 and 9.

If the generator 3 is connected to the circuit 1—2 and it is desired to connect the generator 5 to the said circuit, in parallel with the generator 3, the switches 7 and 10 should first be closed. Two circuits are then established, one from the generator 3 through the switch 10, the left halves of the resistances 8 and 9, and the instrument 11, and the other from the generator 5 through the switch 7, the right halves of the resistances 8 and 9 and the instrument 11, the directions of the currents of the said circuits being opposite in the instrument 11, which is in a common portion of both circuits. If there is any difference between the voltages of the generators it will be indicated by the instrument 11, which is preferably so constructed that it will indicate which of the generators gives the highest voltage.

When the speed of the generator 5 becomes such that its voltage is approximately the same as that of the generator 3, the switch 6 may be closed in order to connect the generator 5 to the circuit 1—2.

Since there is no connection between the generators of such a character that current may flow from one to the other when the voltage relation of the two generators is tested, and since the resistances 8 and 9 are included in the connection which is provided, it will be seen that the circuits are effectively isolated until connected through the distributing circuit 1—2.

I claim as my invention:

1. An electric system comprising two circuits, resistances connected, respectively, between the said circuits and between conductors thereof of opposite polarity, and an electrical instrument connected between intermediate points of the resistances.

2. An electrical system comprising two circuits, resistances, an electrical instrument connected between intermediate points of the resistances, and means for connecting the resistances between the said circuits and between conductors thereof of opposite sign.

In testimony whereof, I have hereunto subscribed my name this 24th day of August, 1907.

FRANK CONRAD.

Witnesses:
J. B. GIBBS,
BIRNEY HINES.